Patented Jan. 8, 1935

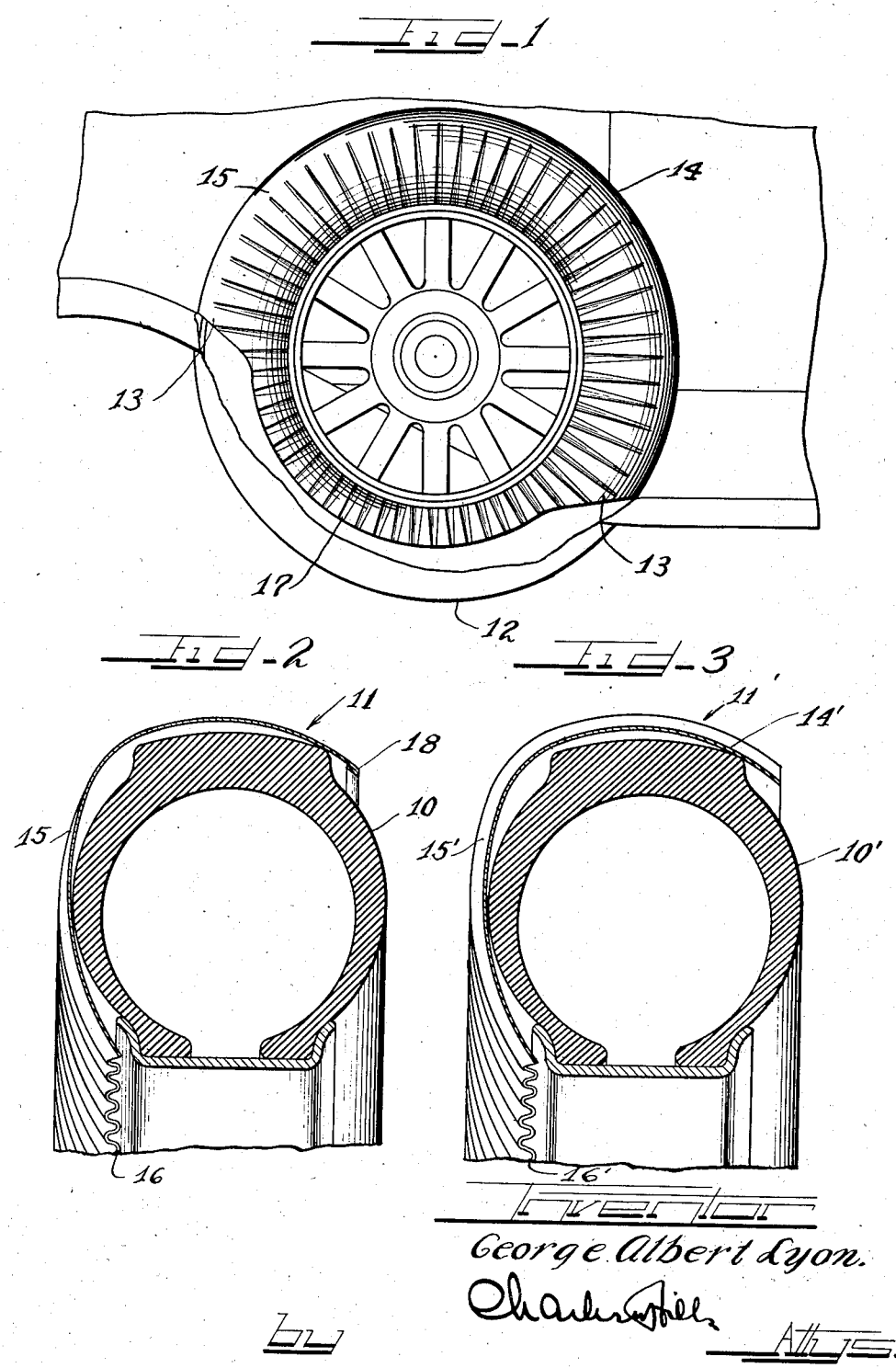

1,986,834

UNITED STATES PATENT OFFICE 1,986,834

CORRUGATED PUSH DOWN TIRE COVER

George Albert Lyon, Allenhurst, N. J., assignor to Lyon, Incorporated, Asbury Park, N. J., a corporation of Delaware Application January 2, 1932, Serial No. 584,553

2 Claims. (Cl. 150—54)

This invention relates to a cover for an automobile spare tire and more particularly to a cover formed to be shoved downwardly onto an automobile spare tire carried in the conventional fenderwell of an automobile.

The object of this invention is to provide an improved automobile spare tire cover of relatively rigid and self-sustaining construction and formed to be shoved downwardly with facility on a spare tire disposed in the fenderwell of an automobile.

Another object of the invention relates to the provision of an improved cover for spare tires of automobiles adapted to be bodily shoved downwardly as a unit onto a spare tire into self-retained engagement with the tire.

Still another object of the invention has to do with the provision of an improved and simplified form of cover which is corrugated to provide it with the requisite flexibility whereby it may be readily shoved into retained engagement with the tire.

In accordance with the general features of this invention there is provided a cover including rim and side portion for disposition over the exposed portions of the tread and outer side wall of a spare tire which portions together comprise part of an arcuate or split ring whose ends are arranged to terminate at the mouth of the fenderwell, but which ring includes a downwardly projecting portion integral with the side portion of the cover adapted to project into the fenderwell; this ring being of such circumferential length as to extend about substantially more than one-half of the outer periphery of the tire or in other words to be disposed about more than 180 degrees of the tire.

Another feature of the invention resides in the provision of means in the form of corrugations for providing the cover with the requisite flexibility for insuring its ready mounting upon the spare tire.

Other objects and features of this invention will more fully appear from the following detailed description taken in connection with the accompanying drawing which illustrates several embodiments thereof and in which Figure 1 is a side view of a cover of my invention and showing the cover applied to a spare tire in an automobile fenderwell.

Figure 2 is an enlarged fragmentary cross-sectional view taken transversely through the cover of my invention and showing it applied to the tire.

Figure 3 is a sectional view similar to Figure 2 but showing a slightly modified form of cover to the extent that both the side and rim portions of the cover are corrugated.

On the drawing:

The reference character 10 designates generally a spare tire to which my novel cover 11 is applied. This tire is disposed in the usual automobile fenderwell 12.

The cover 11 of my invention is of curved form and in reality comprises a split arcuate ring the ends 13—13 of which terminate at the mouth of the fenderwell 12. This ring may be made of any suitable relatively rigid material as distinguished from fabric, such, for example, as metallic sheet. It comprises a rim portion 14 and a side portion 15 which portions are convexly curved and are adapted to cover the exposed tread and outer side wall portions of the tire 10 disposed in the fenderwell 12. The side portion 15 of this cover is provided with a plurality of corrugations 16, which, as will be noted from Figure 1, radiate from a common center. Each of these corrugations 16 progressively increases in size in a direction toward the center of the wheel or tire so that each of these corrugations has its largest cross section at the inner edge of the ring like plate portion 15. It is these corrugations which provide the cover with sufficient flexibility to enable its ready application to the tire 10.

It will also be noted from Figure 1 that the side portion 15 has a downwardly extending corrugated part 17 disposed between the ends 13—13 of the spread ring. This corrugated part 17 is adapted to project into the fenderwell 12 so as to aid in properly aligning and maintaining the cover on the tire.

Attention is also directed to the fact that the rim or tread covering portion 14 of the cover has its free or marginal edge 18 composed of a turned edge which projects inwardly a slight distance from the outermost periphery of the tire so as to engage over the rear side and edge of the tread of the tire and thus retain the cover on the tire against lateral displacement therefrom.

It is due to this inwardly projecting edge 18 of the cover that it is necessary to provide the cover with means in the form of the corrugations 16 whereby the cover may be flexed to a sufficient extent to enable it to pass the halfway points on the tire or in other words to enable the cover to be flexed over more than 180 degrees of the tire. These corrugations 16 in the side portion 15 of the cover provide the cover with sufficient flexibility whereby the ends of the tread portion 14 may be flexed as the cover is shoved downwardly into proper tire protecting position on the tire 10.

In Figure 3 I have illustrated a modified form of tire cover 11' applied to a tire 10' which cover includes rim portions 14' and 15' similar to the portions 14 and 15 of the cover shown in Figure 2 with the exception that the corrugations 16' extend clear across both the side and rim portions of the cover.

The operation of this modified form of cover is substantially the same as the other form with the exception that the flexibility of the cover is considerably enhanced as a result of the increase in the size of the corrugations in the cover.

Now I desire it understood that although I have illustrated and described in detail the preferred embodiments of my invention, the invention is not to be thus limited but only in so far as defined in the scope and spirit of the appended claims.

I claim as my invention:

1. In an article of manufacture, a tire cover comprising an arcuate ring formed open at its bottom to be shoved downwardly onto a spare tire in a fenderwell of an automobile and having its ends arranged to terminate at the mouth of the fenderwell, said ring including rim and side portions for disposition over the exposed tread and outer side wall portions of the tire in the well, said side portion of the cover being transversely corrugated through a major part of its width in order to provide the ring member with flexibility sufficient to enable it to be shoved downwardly onto the tire into proper tire protecting position thereon, and said side portion including a downwardly projecting central part disposed between the ends of the arcuate ring member and adapted to extend into the well to aid in the alignment of the cover with the well, and to aid in the maintenance of the cover on the tire.

2. In an article of manufacture a tire cover comprising an arcuate ring formed open at its bottom to be shoved downwardly onto a spare tire in a fenderwell of an automobile and having its ends arranged to terminate at the mouth of the fenderwell, said ring including rim and side portions for disposition over the exposed tread and outer side wall portions of the tire in the well, said side portion of the cover being transversely corrugated through a major part of its width in order to provide the ring member with flexibility sufficient to enable it to be shoved downwardly onto the tire into proper tire protecting position thereon, and said side portion including a downwardly projecting central part disposed between the ends of the arcuate ring member and adapted to extend into the well to aid in the alignment of the cover with the well, and to aid in the maintenance of the cover on the tire, said rim portion of the cover having an inwardly extending marginal edge at its rear side which projects inwardly of the outermost periphery of the tire to an extent sufficient to enable it to engage over the rear side of the tread of the tire so as to aid in retaining the cover on the tire and against lateral displacement therefrom.

GEORGE ALBERT LYON.